United States Patent
Matthews, Jr.

(10) Patent No.: US 7,403,615 B2
(45) Date of Patent: Jul. 22, 2008

(54) METHODS AND APPARATUS FOR ACCELERATING ARC4 PROCESSING

(75) Inventor: Donald P. Matthews, Jr., Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 627 days.

(21) Appl. No.: 10/026,109

(22) Filed: Dec. 20, 2001

(65) Prior Publication Data

US 2003/0044007 A1 Mar. 6, 2003

Related U.S. Application Data

(60) Provisional application No. 60/314,684, filed on Aug. 24, 2001.

(51) Int. Cl.
H04L 9/00 (2006.01)
H04K 1/00 (2006.01)

(52) U.S. Cl. .................... 380/42; 380/255; 380/37

(58) Field of Classification Search ............ 380/42, 380/255, 37
See application file for complete search history.

(56) References Cited

U.S. PATENT DOCUMENTS

| | | | |
|---|---|---|---|
| 4,737,933 A | 4/1988 | Chiang et al. | |
| 4,998,221 A * | 3/1991 | Correale, Jr. | 365/189.07 |
| 5,297,206 A | 3/1994 | Orton | |
| 5,796,836 A | 8/1998 | Markham | |
| 5,870,474 A | 2/1999 | Wasilewski et al. | |
| 5,936,967 A | 8/1999 | Baldwin et al. | |
| 5,943,338 A | 8/1999 | Duclose et al. | |
| 6,088,800 A | 7/2000 | Jones et al. | |
| 6,111,858 A | 8/2000 | Greaves et al. | |
| 6,216,167 B1 | 4/2001 | Momirov | |
| 6,289,418 B1 * | 9/2001 | Koppala | 711/132 |
| 6,549,622 B1 * | 4/2003 | Matthews, Jr. | 380/29 |
| 6,694,430 B1 * | 2/2004 | Zegelin et al. | 713/160 |
| 6,873,707 B1 * | 3/2005 | Batcher | 380/255 |
| 7,006,634 B1 * | 2/2006 | Batcher | 380/261 |
| 7,277,542 B2 * | 10/2007 | Duval | 380/37 |
| 2002/0037079 A1 * | 3/2002 | Duval | 380/37 |
| 2002/0186839 A1 * | 12/2002 | Parker et al. | 380/37 |
| 2003/0167374 A1 * | 9/2003 | Hronik | 711/104 |
| 2005/0240764 A1 * | 10/2005 | Koshy et al. | 713/170 |

FOREIGN PATENT DOCUMENTS

| | | |
|---|---|---|
| EP | 0 241 671 | 10/1987 |
| JP | 11213671 | 8/1999 |
| WO | WO 01/80483 | 10/2001 |

OTHER PUBLICATIONS

Schneier, Bruce, "Applied Cryptography", 1996, John Wiley & Sons, Inc., 2nd editiion, pp. 397-398.*

(Continued)

*Primary Examiner*—Emmanuel L Moise
*Assistant Examiner*—Michael Pyzocha
(74) *Attorney, Agent, or Firm*—Sterne Kessler Goldstein & Fox, p.l.l.c.

(57) ABSTRACT

Methods and apparatus are provided for improving ARC4 processing in a cryptography engine. A multiple ported memory can be used to allow pipelined read and write access to values in memory. Coherency checking can be applied to provide that read-after-write and write-after-write consistency is maintained. Initialization of the memory can be improved with a reset feature occurring in a single cycle. Key shuffle and key stream generation can also be performed using a single core.

8 Claims, 7 Drawing Sheets

OTHER PUBLICATIONS

Kundarewich et al., "A CPLD-based RC4 cracking system", 1999, IEEE, pp. 397-401.*

J. Burke et al. "Architectural Support for Fast Symmetric-Key Cryptography" Proceedings of the Ninth International Conference on Architectural Support for Programming Languages and Operating Systems (ASPLOS). Nov. 12-15, 2000. pp. 178-189.*

"Applied Cryptography, Second Edition", Schneider, B., 1996, John Wiley & Sons, New York, XP002184521, cited in the application, p. 442, paragraph 18.7—p. 445.

"SHA: The Secure Hash Algorithm Putting Message Digests to Work", Stallings, W., Dr. Dobbs Journal, Redwood City, CA, Apr. 1, 1994, p. 32-34, XP000570561.

Analog Devices: "ADSP2141 SafeNetDPS User's Manual, Revision 6",. Analog Devices Technical Specifications, Mar. 2000, XP002163401, 87 Pages.

C. Madson, R. Glenn: "RFC 2403- The Use of HMAC-MD5-96 within ESP and AH", IETF Request for Comments, Nov. 1998, XP002163402, Retrieved from Internet on Mar. 20, 2001, http://www.faqs.org/rfcs/frc2403.html, 87 Pages.

S. Kent, R. Atkinson: "RFC 2406-IP Encapsulating Security Payload (ESP)" IETF Request for Comments, Nov. 1998, XP002163400, Retrieved from the Internet on Mar. 20, 2001, http://www.faqs.org/rfcs/frc2406.html, 5 Pages.

Keromytis, et al., "Implementing IPsec", Global Telecommunications Conference (Globecom), IEEE, Nov. 3, 1997, pp. 1948-1952.

Pierson, et al., "Context-Agile Encryption for High Speed Communication Networks", Computer Communications Review, Association for Computing Machinery, vol. 29, No. 1, Jan. 1999, pp. 35-49.

Sholander, et al., "The Effect of Algorithm-Agile Encryption on ATM Quality of Service", Global Telecommunications Conference (Globecom), IEEE, Nov. 3, 1997, pp. 470-474.

Smirni, et al., "Evaluation of Multiprocessor Allocation Policies", Technical Report, Vanderbilt University, Online, 1993, pp. 1-21.

Tarman, et al., "Algorithm-Agile Encryption in ATM Networks", IEEE Computer, Sep. 1998, vol. 31, No. 1, pp. 57-64.

Wassal, et al., "A VLSI Architecture for ATM Algorithm-Agile Encryption", Proceedings Ninth Great Lakes Symposium on VLSI, Mar. 4-6, 1999, pp. 325-328.

Analog Devices: "Analog Devices and IRE Announce First DSP-Based Internet Security System-On-A-Chip", Analog Devices Press Release, Online, Jan. 19, 1999, pp. 1-3. http://content.analog.com/pressrelease/prdisplay/0,1622,16,00.html.

3Com: "3Com Launces New Era of Network Connectivity", 3Com Press Release, Jun. 14, 1999, pp. 1-3.

"Secure Products VMS115", VLSI Technology, Inc., Printed in USA, Document Control: VMS115, VI, 0, Jan. 1999, pp. 1-2.

"VMS115 Data Sheet", VLSI Technology, Inc., a subsidiary of Philips Semiconductors, Revision 2:3, Aug. 10, 1999, pp. 1-64.

"Data Sheet 7751 Encryption Processor", Network Security Processors, Jun. 1999, pp. 1-84.

Senie, D., "NAT Friendly Application Design Guidelines", Amaranth Networks, Inc., NAT Working Group, Internet-Draft, Sep. 1999, pp. 1-7.

Floyd, Sally, et al., "Random Early Detection Gateways for Congestion Avoidance", Lawrence Berkeley Laboratory, University of California, IEEE/ACM Transactions on Networking, Aug. 1993, pp. 1-32.

Egevang, K., et al., "The IP Network Address Translator (NAT)", Network Working Group, May 1994, pp. 1-10.

Pall, G. S., et al., "Microsoft Point-To-Point Encryption (MPPE) Protocol", Microsoft Corporation, Network Working Group, Internet Draft, Oct. 1999, pp. 1-12.

Deutsch, P., "Deflate Compressed Data Format Specification Version 1.3", Aladdin Enterprises, Network Working Group, May 1996, pp. 1-17.

Kent, S., "IP Authentication Header", Network Working Group, Nov. 1998, pp. 1-22.

Kent, S., "IP Encapsulating Security Payload (ESP)", Network Working Group, Nov. 1998, pp. 1-22.

Maughan, D, et al., "Internet Security Association and Key Management Protocol (ISAKMP)", Network Working Group, Nov. 1998, pp. 1-20.

Harkins, D., et al., "The Internet Key Exchange (IKE)", Cisco Systems, Network Working Group, Nov. 1998, pp. 1-12.

Srisuresh, P., "Security Model with Tunnel-mode Ipsec for NAT Domains", Lucent Technologies, Network Working Group, Oct. 1999, pp. 1-11.

Shenker, S., "Specification of Guaranteed Quality of Service", Network Working Group, Sep. 1997, pp. 1-20.

Srisuresh, P., et al., "IP Network Address Translator (NAT) Terminology and Considerations", Lucent Technologies, Network Working Group, Aug. 1999, pp. 1-30.

Kent, S., et al., "Security Architecture for the Internet Protocol", Network Working Group, Nov. 1998, pp. 1-66.

"Compression for Broadband Data Communications", BlueSteel Networks, Inc., Sep. 8, 1999, pp. 1-9.

"Securing and Accelerating e-Commerce Transactions", BlueSteel Networks, Inc., Revision 2.0, Oct. 20, 1999, pp. 1-7.

"Securing Broadband Communications" BlueSteel Networks, Inc., Sep. 8, 1999, pp. 1-10.

R. Sedgewick, "Algorithms in C—Third Edition", 1998, Addison Wesley XP002163543, pp. 573-608.

Paul D. Kundarewich et al., *A CPLD-based RC-4 Cracking System*, Electrical and Computer Engineering, 1999 IEEE Canadian Conference on Edmonton, Alta., Canada May 9-12, 1999, Piscataway, NJ, USA, IEEE, US May 9, 1999, pp. 397-402.

European Search Report dated Jun. 3, 2003 for EP 02 25 4773.

* cited by examiner

METHODS AND APPARATUS FOR ACCELERATING ARC4 PROCESSING

CROSS REFERENCE TO RELATED APPLICATIONS

This application claims priority under U.S.C. 119(e) from U.S. Provisional Application No. 60/314,684, entitled "Methods And Apparatus For Accelerating ARC4 Processing," as of filing on Aug. 24, 2001, the disclosure of which is herein incorporated by reference for all purposes.

BACKGROUND OF THE INVENTION

1. Field of the Invention

The present invention relates to accelerating ARC4 processing. More specifically, the present invention relates to methods and apparatus for improving ARC4 based data stream encryption and decryption.

2. Description of Related Art

Conventional software and hardware designs for implementing ARC4 processing handle ARC4 operations in sequence. An ARC4 processing block in a cryptography engine typically reads and writes values into a memory in a set sequence. One read may be dependent on a prior write, or a write may be dependent on another prior write. Because of the dependencies, ARC4 operations are typically performed in a strict sequence. ARC4 and other key stream algorithms are described in Applied Cryptography, Bruce Schneier, John Wiley & Sons, Inc. (ISBN 0471128457), incorporated by reference in its entirety for all purposes.

To generate a single byte of key stream using ARC4, three reads and two writes to a memory are required. The dependencies in the read and write operations can cause a single round of ARC4 processing to take many clock cycles simply for data value reads and writes. In a conventional approach using a single ported memory, it takes 5 cycles to generate a single byte of key stream.

It is therefore desirable to provide methods and apparatus for improving ARC4 processing in a cryptography engine with respect to some or all of the performance limitations noted above.

SUMMARY OF THE INVENTION

Methods and apparatus are provided for improving ARC4 processing in a cryptography engine. A multiple ported memory can be used to allow pipelined read and write access to values in memory. Coherency checking can be applied to provide that read-after-write and write-after-write consistency is maintained. Initialization of the memory can be improved with a reset feature occurring in a single cycle. Key shuffle and key stream generation can also be performed using a single core.

According to various embodiments, a cryptography accelerator for generating a stream cipher is provided. The cryptography accelerator includes a key stream generation core for performing key stream generation operations and a memory associated with the key stream generation core. The memory includes a plurality of input ports configured to obtain write data associated with a stream cipher and a plurality of output ports configured to provide read data associated with the stream cipher. The key stream generation core and the memory are operable for performing a plurality of read data operations and a plurality of write data operations associated with generating the stream cipher in a single cycle.

According to another embodiment, a memory associated with a cryptography engine for generating a stream cipher is provided. The memory includes a plurality of input ports configured to obtain write data associated with generating a stream cipher and a plurality of output ports configured to provide read data associated with the stream cipher. The plurality of read data operations and the plurality of write data operations associated with generating the stream cipher are performed in a single cycle.

In still another embodiment, a method for pipelined generation of a key stream is provided. During a first clock cycle, the method includes incrementing a first address. During a second clock cycle, the method includes reading a first memory value at the first address, reading a second memory value at the second address obtained by adding the memory value at the first address to a previous second address, writing the first memory value to the second address and the second memory value to the first address, and summing the first and second memory values to yield a third address. During a third clock cycle, the method includes reading a third memory value at the third address.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

The present invention relates to implementing a cryptography accelerator. More specifically, the present invention relates to methods and apparatus for accelerating ARC4 processing.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of ARC4 processing. However, it should be noted that the techniques of the present invention can be applied to a variety of different cryptography processing blocks such as variants to ARC4. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
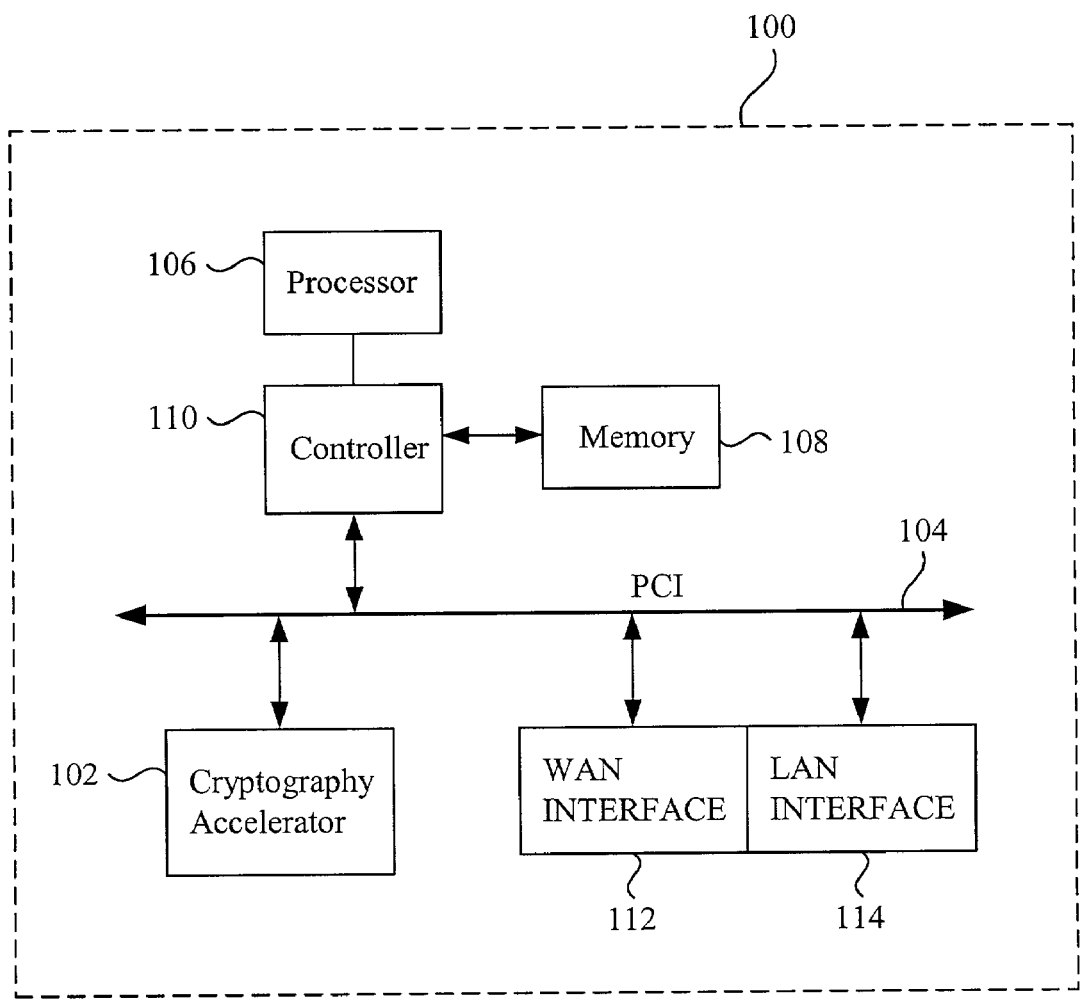
FIG. 1 is a diagrammatic representation of a system that can use the techniques of the present invention.

FIG. 1 is a diagrammatic representation of one example of a cryptographic processing system 100 in accordance with an embodiment of the invention. As shown in FIG. 1, the present invention may be implemented in a stand-alone cryptography accelerator 102 or as part of the system 100. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110. Although the processing unit 106 may be the central processing unit or CPU of a system 100, it does not necessarily have to be the CPU.

It can be one of a variety of processors in a multiprocessor system, for example. A LAN interface 114 can couple the processing system 100 to a local area network (LAN) to receive packets for processing and transmit processed packets. Likewise, a Wide Area Network (WAN) interface 112 connects the processing system to a WAN (not shown) such as the Internet and manages in-bound and out-bound packets, providing automatic security processing for IP packets.

Figure 2:
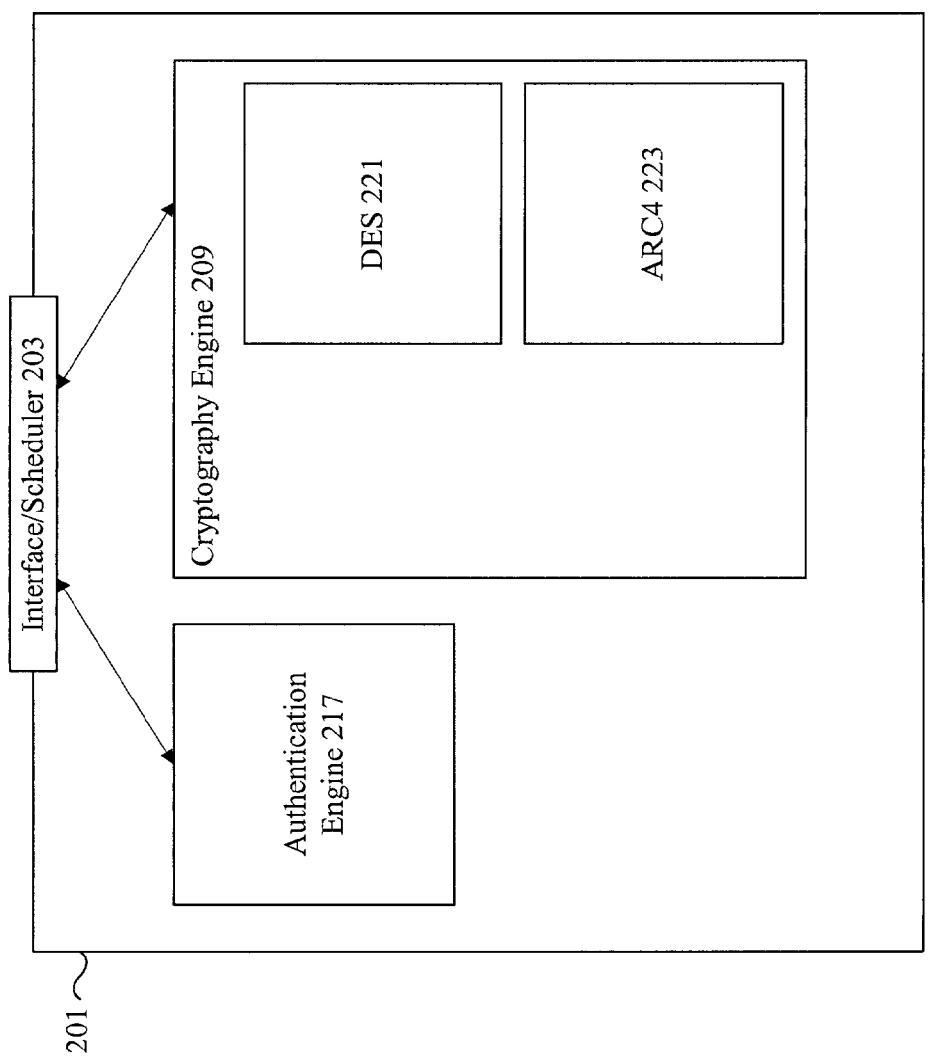
FIG. 2 is a diagrammatic representation of a cryptography engine having an authentication engine, cryptography engine, and multiple public key engines.

FIG. 2 is a diagrammatic representation of a cryptography accelerator 201. The cryptography accelerator 201 includes an interface 203 connected to a host such as an external processor. The interface 203 can receive information from the host for processing and send information to the host when processing is completed. The interface 203 can include a scheduler for determining whether to send data blocks to various processing engines such as authentication engine 217 and cryptography engine 209. Cryptography engine 209 can include DES engine 221 and ARC4 engine 223. It should be noted that a cryptography accelerator 201 can include other components as well, such as a public key engine. ARC4 engine can be used for ARC4 processing. ARC4 processing is described as RC4 processing in Applied Cryptography, Bruce Schneier (ISBN 0471128457), the entirety of which is incorporated by reference for all purposes.

The ARC4 algorithm is a stream cipher that generates a key stream for combination with a data stream. The key stream is XORed with a data stream to encrypt a plain text data stream or to decrypt a cipher text data stream.

Figure 3:
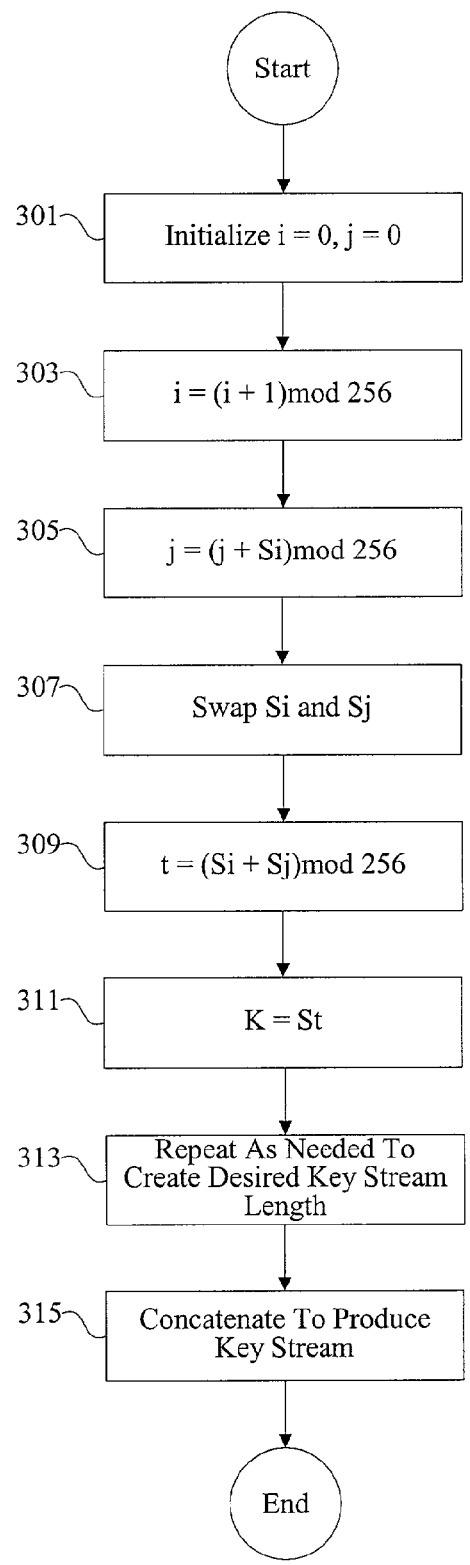
FIG. 3 is a process flow diagram showing the generation of a key stream.

FIG. 3 is a process flow diagram showing the generation of a key stream. For the initial key stream that is generated, i, j, and t values are used. Both i and j are 8 bit values that ignore any carry out (mod 256 function) resulting from any operations such as addition of the two values. In addition, t is an 8-bit value that also ignores any carry out for a result that is written into t. S is a 256 byte register that is referenced by an address. Si indicates the value in the register at address 'i'. K is a byte that is part of the generated key stream. If the desired key stream is to be 7 bytes long, then the following operations are performed 7 times, with the 7 resulting K values concatenated together to form the 7 byte key stream.

According to various embodiments, the values i and j are initialized to a value of zero at 301. At 303, i is incremented by 1 and any carry out is ignored (mod 256 function). At 305, j gets the value in the S register at address i added to the previous value of j. Again, any carry out is ignored. At 307, the values in the S register at address i and address j are swapped. At 309, t gets the value of the register at address i added to the value of the register at address j, ignoring again any carry out. The generated key stream byte is the value of the register at address t.

In other words, generating a random byte can include performing the following operations:

i=(i+1)mod 256;

j=(j+Si)mod 256;

swap Si and Sj;

t=(Si+Sj)mod 256;

K=St;

The process flow from step 301 to step 311 is repeated to generate additional key stream bytes based on the desired key stream length at 313. The generated key stream bytes are then concatenated to produce the key stream. Although conventional implementations of ARC4 use a specific processing sequence, variations to ARC4 are contemplated. In one example, the values i, j, and t can be used to reference not a 256 value register but a 65536 value register. Instead of using a mod 256 function, a mod 65536 function could be used.

After the key stream is generated, the i, j, and S register values can be saved to generate a further key stream that can be associated with the previous key stream. This will allow the key stream to be generated as a single request or multiple requests with the values saved in between the requests.

The S register values can either be loaded from a save operation, or they can be generated from a new Key that is used to initialize the S register by performing a key shuffle operation.

Figure 4:
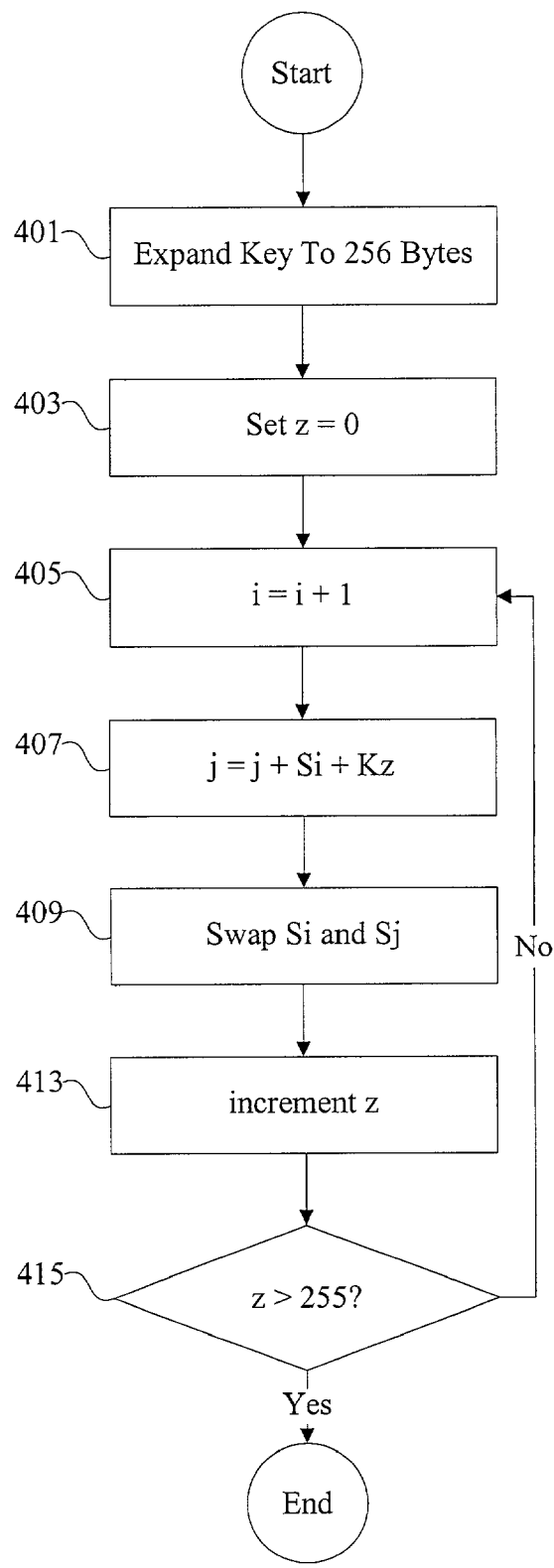
FIG. 4 is a process flow diagram showing a key shuffle operation, according to various embodiments.

FIG. 4 is a process flow diagram showing a key shuffle operation, according to various embodiments. At 401, a supplied key is converted into an expanded 256 byte key. To expand the key to 256 bytes, the key is copied until there are at least 2048 continuous bits and then use the first 2048 bits as the 256 bytes in order. Kz is the zth byte of the expanded key. The S register values can then be initialized. At 403, z is set to 0. At 405, i is incremented by one. At 407, j is added to the register value at address i and byte i of the expanded key. The sum without any carry out is the new value of j. At 409, the register values at address i and address j are swapped. At 413, z is incremented. At 415, if it is determined that z is greater than 255, the key shuffling operation is complete. Otherwise, i is again incremented at 405 and the key shuffling operation continues.

In other words, the key shuffle operations are performed using the following sequence:

Expand the supplied 'new Key' to 256 bytes;

Initialize the S register with the values 0 to 255 in S register locations 0 to 255 respectfully;

For z=0 to 255 i=i+1;

j=(j+Si +Kz) mod 256;

Swap Si and Sj;

One difference between the key shuffle operation and the key stream generation is that the key shuffle generates the next j value by adding a key value to the calculation (j=j+Si+Keyi instead of j=j+Si). Also, the generation of the t value and the reading of the St register value are not needed.

In a conventional implementation, the key shuffle operation would be a different logic core from that used for the key stream generation. This would increase the size of the design. As implemented in accordance with the present invention, the key shuffle operation uses the same core as that for the key stream generation. This is done by always having the j value calculated as: j=j+Si+Keyi. When in key shuffle mode, the Key values are passed in as Keyi values. When in key stream generation, the Keyi value is set to zero.

Before the key shuffle is done, the S register can be initialized with the values 0 to 255 in locations 0 to 255 respectfully. In a conventional system, this initialization would be done writing the initial value to every location in the S register. In accordance with various embodiments, the S register is designed with a reset feature that will allow the S register initialization to occur in a single cycle with a reset command. A single cycle reset can occur using a five ported memory implemented using registers and flip-flops.

Figure 5:
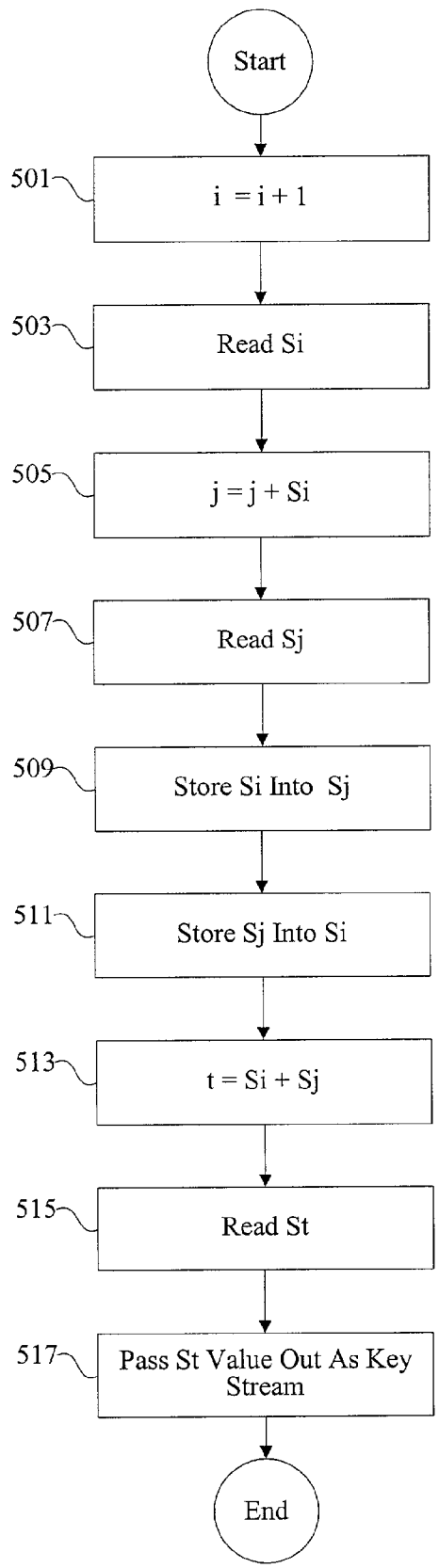
FIG. 5 is a process flow diagram showing an implementation of a stream cipher algorithm.

FIG. 5 is a process flow diagram showing an implementation of a stream cipher algorithm. At 501, i is incremented by one. At 503, the value of the register at address i is read. At 505, j gets the value of the register value at address I added to the previous value of j. At 507, the value of the register at address j is read. At 509, the value of the register at address i is stored into the value of the register at address j. At 511, the value of the register at address j is stored into the value of the register at address i. According to various embodiments, steps 509 and 511 can be done in the same clock cycle. Similarly, 503 and 505 as well as 507 and 513 can also be performed in the same clock cycle. However, it should be appreciated that steps 509 and 511 can be done at different times, although more checking may be needed. At 513, t gets the sum of the values of the register at addresses i and j without any carry out. The value of the register at address t is read at 515 and passed at 517 out as the key stream byte.

To generate a single byte of key stream, three reads at 503, 507, and 515 and two writes at 509 and 511 to the S register are used. It should be noted that the three read operations and the two write operations are not independent. In one example, the read operation at 515 may be altered by the write operation at 509.

According to various embodiments of the present invention, techniques and apparatus are provided to allow the implementation of the three reads and two writes as a single operation. The selected implementation recognizes characteristics of the ARC4 algorithm to allow pipelined processing even though data in any given stage may be dependent on incoherent data. Coherency checks are discussed further below. By performing coherency checks, ARC4 operations can be performed in a pipelined manner.

In one embodiment, the S register is implemented as a 5 port register with three read ports and two simultaneous write ports. With this implementation, the read ports can be asynchronous and the write ports can be synchronous. The 5 ported memory can be implemented as a custom memory or as a flip-flop based register.

Figure 6:
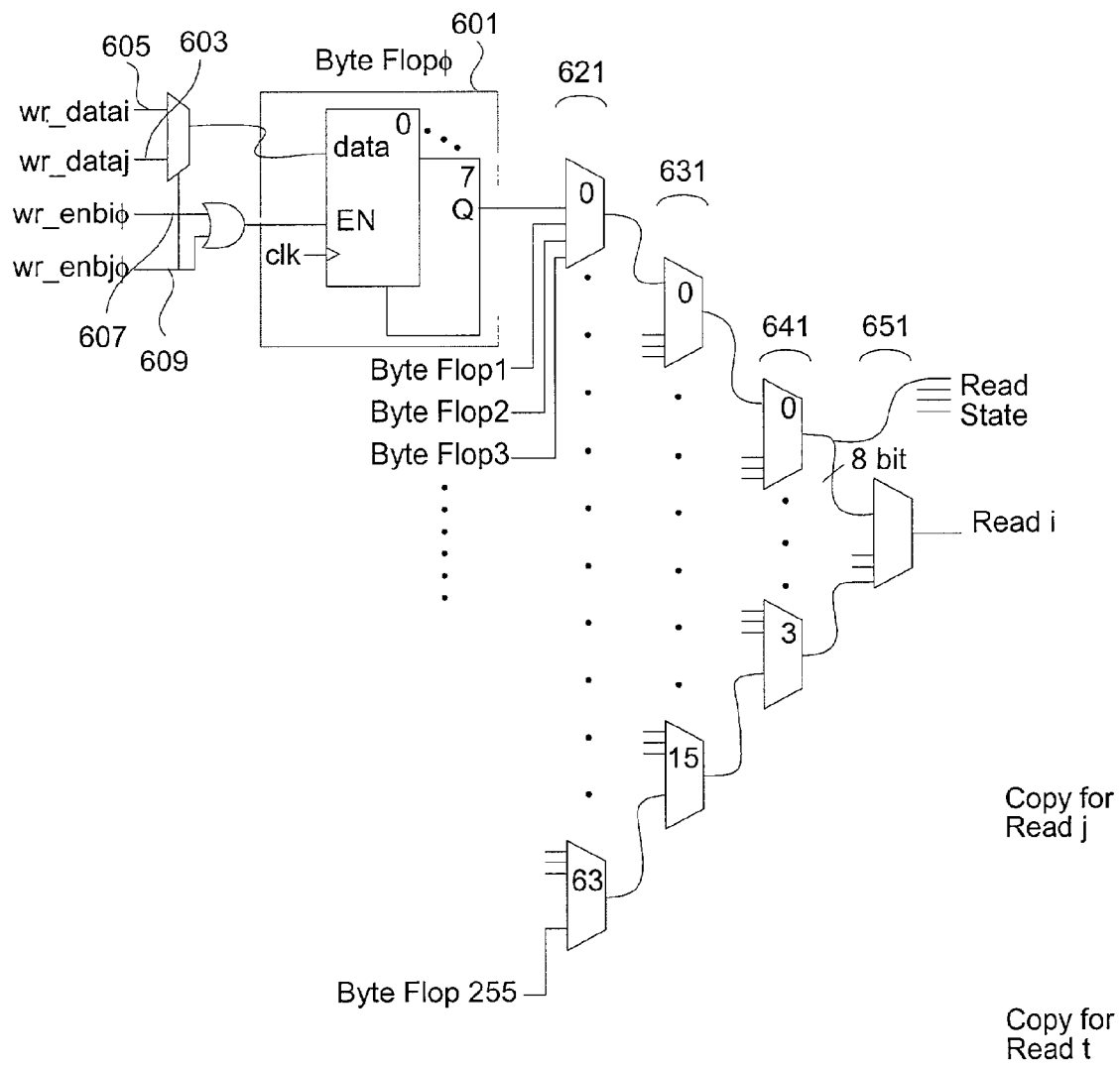
FIG. 6 is a diagrammatic representation of a flip-flop based register.

FIG. 6 is a diagrammatic representation of a flip-flop based register. It should be noted that a variety of multiple ported memories can be used to implement the techniques of the present invention. Such multiple ported memories can include a plurality of registers and multiplexers. Each register can have input lines 603 and 605 associated with i data and j data. The registers can also have input lines 607 and 609 indicating whether i data or j data should be enabled. Each register can be clocked at any given frequency. In one example, 256 byte registers at stage 601 can be used where each byte register comprises 8 flops. Four bit flops from four different registers can be passed into each of 64 4-to-1 multiplexers at stage 621. The 4-to-1 multiplexers can then pass outputs to a series of 16 4-to-1 multiplexers at stage 631. The outputs of the 16 4-to-1 multiplexers can then be passed to a series of 4 4-to-1 multiplexers at state 641 and finally to a single 4-to-1 multiplexers with four one byte inputs and a single one byte output at stage 651. The stages 621-651 are repeated eight times to perform a byte read operation.

The one byte output can provide the data for read i. The 255 byte flop structure can be replicated for read j and read t.

By using a 5 ported memory, read and write operations can be performed simultaneously using pipelined operation. In one embodiment, the i value is incremented in a first stage of the pipeline. In the second stage of the pipeline, Si is read and the new j value is calculated. The value from Si is saved. In the third stage of the pipeline, Sj is read and the new t value is calculated. The saved Si value is written into the Sj location (the write must occur after the read). The value from Sj is saved. In the fourth stage of the pipeline, St is read. The saved Sj value is written into the Si location. Table 1 shows one ARC implementation pipeline.

TABLE 1

| | | ARC4 implementation pipeline | | | |
|---|---|---|---|---|---|
| 1st stage | $i_1 = i_0 + 1$ | $i_2 = i_1 + 1$ | $i_3 = i_2 + 1$ | | |
| 2nd stage | | Read $Si_1$ | Read $Si_2$ | Read $Si_2$ | |
| | | Store $Si_1$ into SI | Store $Si_2$ into SI | Store $Si_2$ into SI | |
| | | $j_1 = j_0 + Si_1$ | $j_2 = j_1 + Si_2$ | $j_3 = j_2 + Si_3$ | |
| 3rd stage | | | Read $Sj_1$ | Read $Sj_2$ | Read $Sj_3$ |
| | | | Store $Sj_1$ into SJ | Store $Sj_2$ into SJ | Store $Sj_3$ into SJ |
| | | | $t_1 = SI + Sj_1$ | $t_2 = SI + Sj_2$ | $t_3 = SI + Sj_3$ |
| | | | Write SI into $Sj_1$ | Write SI into $Sj_2$ | Write SI into $Sj_3$ |
| 4th stage | | | | Read $St_1$ | Read $St_2$ | Read $St_3$ |
| | | | | Store $St_1$ into K | Store $St_2$ into K | Store $St_3$ into K |
| | | | | Write SJ into $Si_1$ | Write SJ into $Si_2$ | Write SJ into $Si_3$ |

With this pipelined approach, coherency checks are made to ensure that a read-after-write or a write-after-write coherency situation is avoided. Processing three bytes of key stream results in the following memory events occurring in the following order:

Read Siz
Read Sjz
Store Siz
Store Sjz
Read Stz
Read Siz+1
Read Sjz+1
Store Siz+1
Store Sjz+1
Read Stz+1
Read Siz+2
Read Sjz+2
Store Siz+2
Store Sjz+2
Read Stz+2

The pipeline may cause some of these events to occur before others or simultaneously. To ensure proper memory ordering, the following checks are made.

There are three RAW coherency checks:
When reading Stz, may have to bypass the write to Siz
When reading Sjz+1, may have to bypass the write to Siz
When reading Siz+2, may have to bypass the write to Sjz+1

In the above pipeline, Stz is being read in the same cycle that Siz is being written. Since the memory is implemented as a synchronous write operation and an asynchronous read operation, the write data can be bypassed so that the read is reading the correct value. A variety of structures can be used to allow coherency.

According to various embodiments, it is recognized that when writing Siz will not change the value at Siz+1 because the address is incremented.

Figure 7:
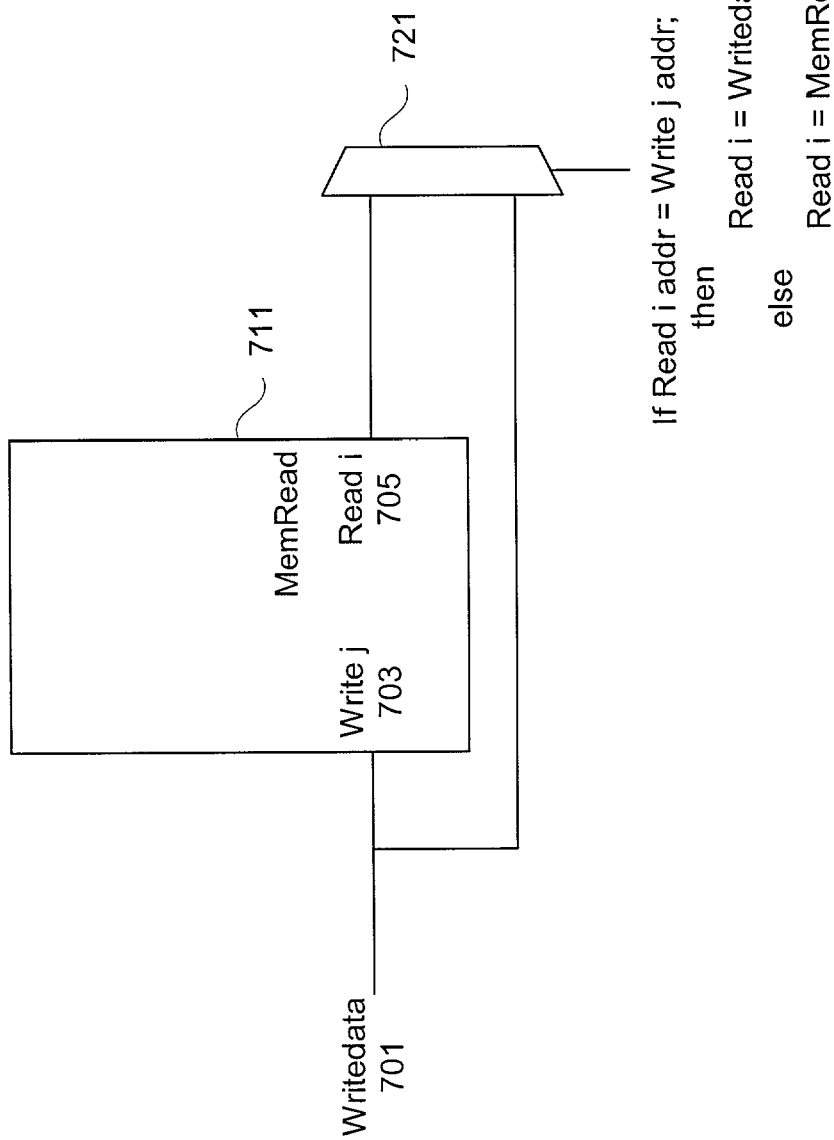
FIG. 7 is a diagrammatic representation showing one technique for bypassing write data.

FIG. 7 is a diagrammatic representation showing one technique for bypassing the write data 701. If a read i address 705 is equal to a write j address 703, then instead of reading i from a memory 711, the data is acquired directly from the input line to the memory. Otherwise, the read i can be performed on memory.

In addition, there can be a check for write-after-write coherency situation. Since the memory has two write ports, there has to be a way to ensure that the correct data is written if both write ports are writing to the same location. In one embodiment, if the write i address is equal to the write j address, a single write operation can be performed instead of performing multiple write operations. That is, there is a single write-after-write coherency check. If the Siz and Sjz+1 are the same, the Sjz+1 write is allowed to continue. This is because the Sjz+1 write is for the swap for the next byte and the Siz is the write for the swap of the current byte.

The performance of the ARC4 engine is dependent on the access to the memory that is used to store the S register. Since there are three read operations and two write operations to generate a single byte of key stream, there is a great need to optimize the memory operations. With the conventional approach with a single ported memory, it will take 5 cycles to generate one byte of key stream. If a dual ported memory is used, the performance can be increased such that a byte of key stream can be generated every 3 cycles. According to various embodiments, the memory is implemented as a 5-ported memory and the performance of the ARC4 engine is that one byte of key stream is generated every cycle. This is a 3 or 5 times performance improvement over the conventional approach.

It is possible to increase the rate of key stream generation by adding additional ports to the memory. There are many different ways that this could be implemented, so that by adding ports to the memory, it would be possible to perform all of the calculations for two or more key stream bytes in the same cycle. There would be times that the simple bypass operation for RAW dependencies would not allow it to complete in a single cycle. Those situations could be remedied by allowing any key stream byte calculations beyond the first one, to be speculative.

By doing simple replication, a 10 ported memory could support 2 bytes of key stream generated per cycle. A 15 ported memory could support 3 bytes and a 20 ported memory could support 4 bytes.

With an alternative design, the Si values will be in consecutive locations within the S register. By making the Si read and write paths to be 4 accesses wide (32 bits) it would be possible to do a 4 byte per cycle key stream generation engine with a 14 ported memory.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of encryption algorithms and should not be restricted to the ones mentioned above. It is therefore intended that the invention be interpreted to include all variations and equivalents that fall within the true spirit and scope of the present invention.

What is claimed is:

1. A cryptographic accelerator for performing an RC4 stream cipher, comprising:
   a multi-ported memory having at least three read ports and at least two write ports; and
   a cryptographic core having a four-stage pipeline, wherein during a clock cycle in a key generation process the cryptographic core is configured to:
   in a first stage, increment the value of a first memory address location,
   in a second stage, read data stored at a previous first memory address location and calculate a value of a second memory address location,
   in a third stage, read data stored at a previous second memory address location, calculate a value of a third memory address location, and write data stored at a previous first memory address location to the previous second memory address location, and
   in a fourth stage, read data stored at a previous third memory address location and write data stored at the previous second memory address location to a previous first memory address location,
   wherein after three initialization clock cycles, a byte of a key stream is generated in the fourth stage by the cryptographic core in each subsequent clock cycle.

2. The cryptographic accelerator of claim 1, wherein during the three initialization clock cycles, the cryptographic core is configured to:
   in a first cycle, increment the first memory address location to a first i value in the first stage;
   in a second cycle, increment the first memory address location to a second i value in the first stage, read data stored at the first memory address location having the first i value and calculate a first j value for the second memory address location in the second stage; and
   in a third cycle, increment the first memory address location to a third i value in the first stage, read data stored at the first memory address location having the second i value and calculate a second j value for the second memory address location in the second stage, and in the third stage, read data stored at the second memory address location having the first j value, calculate a first t value for the third memory address location, and write data stored at the first memory address location having the first i value into the second memory address location having the first j value.

3. The cryptography accelerator of claim 2, wherein in subsequent cycles the cryptographic core is configured to:
   in the first stage, increment the first memory address location to an $n^{th}$ i value,
   in the second stage, read data stored at the first memory address location having the $(n-1)^{th}$ i value and calculate an $m^{th}$ j value for the second memory address location,
   in the third stage, read data stored at the second memory address location having the $(m-1)^{th}$ j value, calculate an $r^{th}$ value for the third memory address location, and the write data stored at the first memory address location having the $(n-2)^{th}$ i value into the second memory address location having the $(m-1)^{th}$ j value; and
   in the fourth stage, read data stored at the third memory address location having the $r^{th}$ t value and output the read data as the keystream byte and write the data stored at the second memory address location having $(m-2)^{th}$ j value into the first memory address having the $(n-2)^{th}$ i value.

4. The cryptography accelerator of claim 3, wherein if the $(n-1)^{th}$ i value used in the read operation of the second stage is the same as the $(m-1)^{th}$ j value used in the write operation of the third stage, then the cryptographic core acquires data for the read operation of the second stage from an input line to the multi-ported memory.

5. The cryptography accelerator of claim 3, wherein if the $(m-1)^{th}$ j value used in the write operation of the third stage is the same as the $(n-2)^{th}$ i value used in the write operation of the fourth stage, then write operation of the fourth stage is not performed by the cryptographic core.

6. The cryptography accelerator of claim 1, wherein the multi-ported memory is a register.

7. The cryptography accelerator of claim 6, wherein the multi-ported memory is a flip-flop based register.

8. The cryptography accelerator of claim 1, wherein the cryptographic core is further configured to shuffle the values stored in the memory addresses of the multi-ported memory during a clock cycle in an Sbox initiation process prior to the key generation process, including:
   in a first stage, increment the value of a first memory address location,
   in a second stage, read a value stored at a previous first memory address location and calculate a second memory address location;
   in a third stage, read data stored at a previous second memory address location and write the data stored at a previous first memory address location to the previous second memory address location, and
   in a fourth stage, write the data stored at the previous second memory address location to a previous first memory address location.

* * * * *